(No Model.)

I. Q. HOLMES.
MOTH CATCHER FOR BEE HIVES.

No. 284,014. Patented Aug. 28, 1883.

Witnesses
J. W. Reynolds
Edward E. Ellis

Inventor
Isaac Q. Holmes
per O. E. Duffy
Atty

UNITED STATES PATENT OFFICE.

ISAAC Q. HOLMES, OF CLARKSVILLE, ARKANSAS.

MOTH-CATCHER FOR BEE-HIVES.

SPECIFICATION forming part of Letters Patent No. 284,014, dated August 28, 1883.

Application filed May 3, 1883. (No model.)

*To all whom it may concern:*

Be it known that I, ISAAC Q. HOLMES, of Clarksville, in the county of Johnson and State of Arkansas, have invented certain new and useful Improvements in Moth-Catchers for Bee-Hives; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to improvements to be used in connection with a bee-hive; and it has for its object to entrap and catch the common bee-moth, which have proved so destructive to the culture of bees; and to this end it consists in a cage or trap of the construction hereinafter described, and having projecting or radiating upwardly therefrom flaring guides, by which the moth is directed into the trap below, the whole to be placed over the bee-entrance to the hive in such manner as will be set forth hereinafter.

Figure 1:
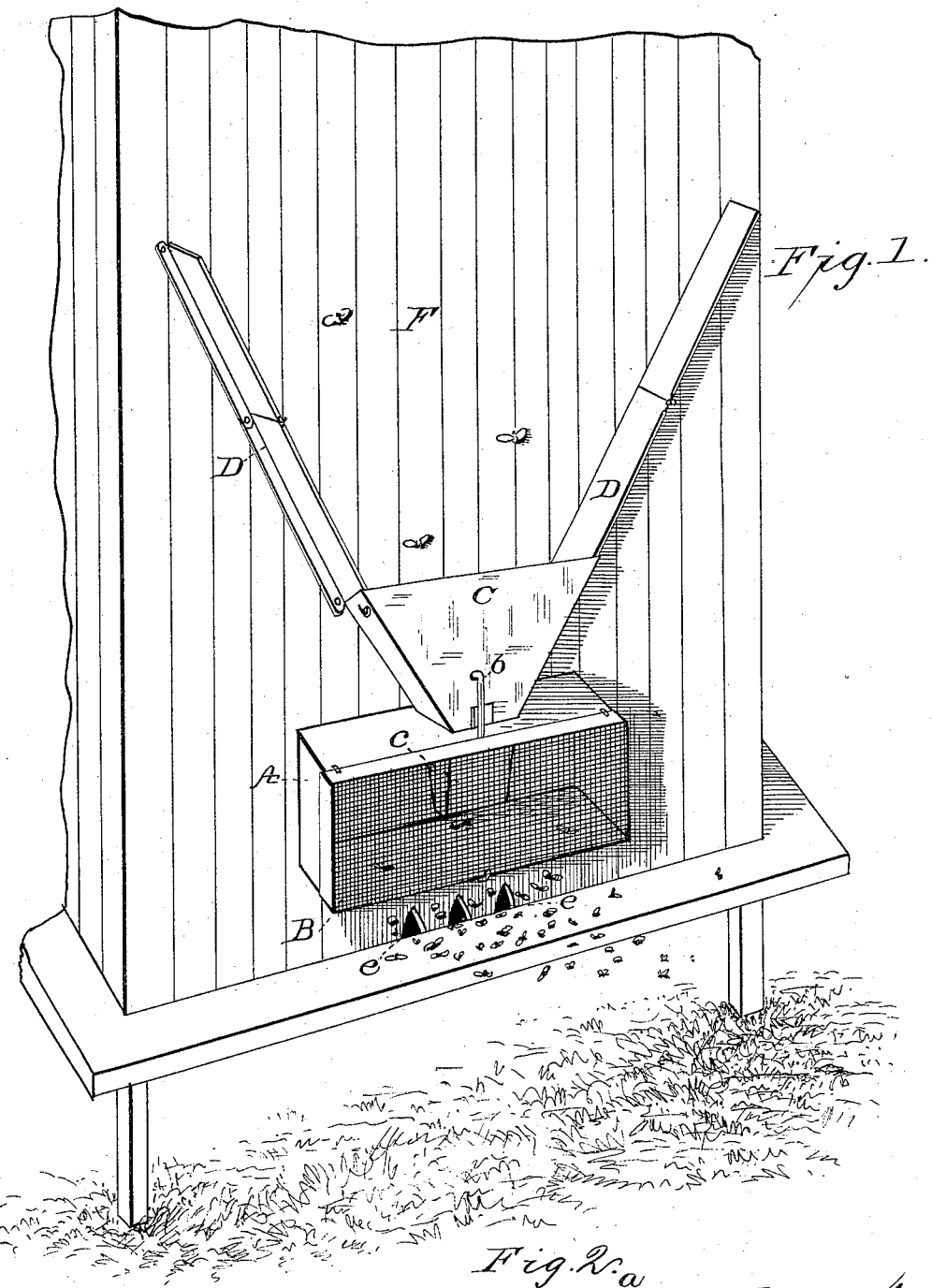
Figure 2:
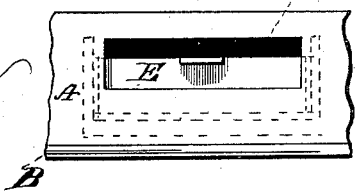

In the drawings hereunto annexed, Figure 1 is a perspective view of my trap as located over the entrance of a bee-hive. Fig. 2 is a top view of the cage, showing a door which is adapted to slide over and close up the opening therein.

Referring to the letters of reference marked thereon, A represents the cage, having a door, B, of wire-gauze or equivalent, to permit its interior to be seen.

C is a funnel having a neck, c, which extends down into the cage through an opening, a, therein at the top. The cage is attached to the funnel by a hook, b, which funnel is preferably secured to the side of the hive in any suitable manner.

Extending upward from the sides of the funnel in a flaring manner are guides D D. Said guides, if desired, for convenience in packing for transportation, can be made in sections and joined together when in use in any approved way.

The opening in the top of the cage, through which extends the neck of the funnel, is adapted to be closed by a sliding door, E, to prevent the escape of moths after the cage is detached for the purpose of destroying the insects.

The flaring guides are designed for the purpose of inclosing between them as much of the surface of the side of the hive on which the trap is located as possible, so that the moth alighting between them will be directed into the trap.

F is the bee-hive, and *e e* are the entrances thereto.

It will be seen that the cage can be detached from the funnel without disturbing the other parts.

From a long experience in the culture of bees, and a careful watching and study of the habits of the moth, which have been so destructive in gaining access to the hives and destroying the eggs and honey, I have noticed that the moths never fly directly for the opening of the hive, but always alight somewhat above, and then crawl down and enter the hive. By placing my device above the bee-entrance the moth will be attracted by the bees flying around beneath, and will consequently alight above, somewhere between the flaring guides D D, and crawl down into the cage and be caught.

The novelty of my trap will be apparent to all those who have been similarly troubled by these destructive insects.

Having thus described my invention, what I claim is—

1. The combination of the cage herein described with the funnel entering the cage and the flaring guides, the whole placed over the bee-entrance to the hive, as and for the purpose set forth.

2. In a moth-catcher for bee-hives, the funnel and flaring guides attached to a bee-hive, as herein described, in combination with the cage, said cage being connected to the funnel by hook *b*, in the manner and for the purpose set forth.

3. In a moth-catcher for bee-hives, the flaring guides and funnel attached to the hive, as herein described, in combination with the cage A, having door B, of wire-gauze or equivalent material, and sliding door E in its top for closing the opening therein, for the purpose set forth.

4. The combination, with a bee-hive, of the flaring guides and funnel, the cage A, connected to said funnel, as described, and having door B, of wire-gauze or equivalent material, and sliding door E in its top, the whole situated over the bee-entrance to the hive, substantially in the manner and for the purpose set forth.

In testimony that I claim the foregoing as my own I affix my signature in presence of two witnesses.

ISAAC Q. HOLMES.

Witnesses:
FRANK O. McCLEARY,
EDWARD E. ELLIS.